United States Patent [19]

Toms et al.

[11] Patent Number: 5,787,572
[45] Date of Patent: Aug. 4, 1998

[54] APPARATUS FOR TERMINATING A FIBRE OPTIC BUNDLE

[75] Inventors: Christopher David Toms; Charles Henry Willis, both of Doncaster, Great Britain

[73] Assignee: Schott Fibre Optics (UK) Limited, Doncaster, United Kingdom

[21] Appl. No.: 599,961

[22] Filed: Feb. 14, 1996

[51] Int. Cl.⁶ ............................................. B23P 21/00
[52] U.S. Cl. .............................. 29/722; 29/800; 29/282; 29/283.5; 29/517
[58] Field of Search ........................ 29/517, 722, 800, 29/234, 237, 282, 283.5

[56] References Cited

U.S. PATENT DOCUMENTS 3,789,485  2/1974  Gudmestad .................... 29/517
4,567,650  2/1986  Balyasny et al. ............... 29/517
5,261,020  11/1993 de Jong et al. ................. 29/747

Primary Examiner—David P. Bryant
Attorney, Agent, or Firm—Rohm & Monsanto, PLC

[57] ABSTRACT

A fibre optic bundle end is produced by placing the end in a ferrule (6) and the bundle (14) and ferrule (6) are supported in a furnace (22) for rotation about the ferrule axis. The ferrule (6) and the fibres (14) therein are heated and while still in the furnace (22) are radially compressed by compression members (2,4) so that the fibres become lightly packed, after which the protruding fibre ends are cut off and the cut surface (16) is polished. The compression is achieved by rotating the ferrule (6) and fibres (14) back and forth about the bundle axis while the compression members which are bars passed through the furnace (22) move together radially of the ferrule (6), the said members being mounted for reciprocation so as to allow the ferrule (6) to roll thereon as it rotates.

11 Claims, 4 Drawing Sheets

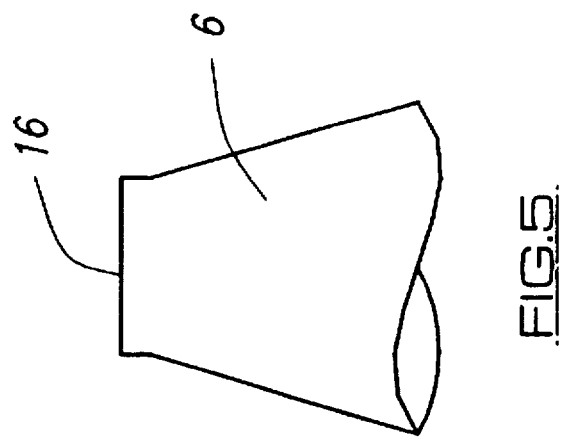
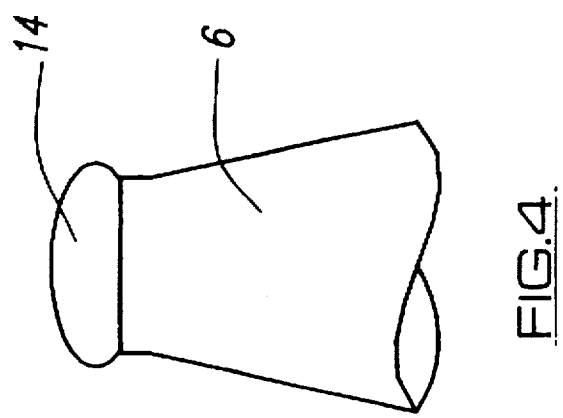
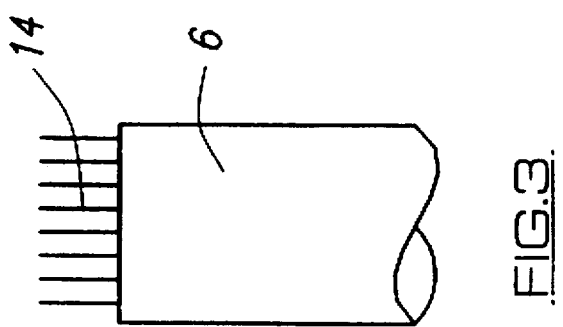

APPARATUS FOR TERMINATING A FIBRE OPTIC BUNDLE

This invention relates to fibre optics, and in particular to a method and apparatus for producing glass fibre bundle terminations, such as fused ends.

It is known in the fibre bundle art to produce such fibre bundle terminations by the injection of epoxy resin into the fibre bundle at the point at which a termination is to be produced. The epoxy resin sets as a fixing matrix around the glass fibres displacing the air from between the fibres, thus allowing the fibre bundle termination to be produced by cutting and polishing. The technique is simple and requires little skill on behalf of a worker producing such terminations. However, the use of epoxy resin has disadvantages one of which is that such a termination is limited as to the temperature at which it can operate; it cannot be used with high power or high heat generating light sources. If the termination becomes too hot the epoxy resin will melt and eventually burn which destroys the optical coupling efficiency of the termination.

Other disadvantages of epoxy resin terminations are described in British Patent Specification No. 1556046, of which the disclosure is incorporated herein by cross reference. The said British Patent proposes a different method of producing a termination on a glass fibre bundle cable, such method including the step of heating and radially compressing the fibre bundle so as to deform the individual fibres to eliminate the air spaces between the fibres followed by cutting and polishing. This type of termination process has come to be known as the hot fusion of glass fibres, although ideally the glass fibres themselves are not actually fused but simply deform from a circular cross section and adopt a close packed structure upon deformation. In the close packed structure, the fibres apart from the outer ones take up a generally hexagonal cross section. In the method of the above-mentioned British patent specification, the optical fibres are inserted in a deformable ferrule which is forced axially into a tapered hole in a die member to compress the fibres.

A further method of hot fusion termination is disclosed in British Patent Application No GB2025084, wherein the compressive force is supplied by a cincture in the form of a ring which exhibits shape and size memory properties. Its temperature is manipulated so as to allow the cincture first to be threaded onto a fibre optic bundle surrounded by a glass ferrule and subsequently to contract onto the enclosed parts to compress the optical fibres.

Prior art methods of hot fusion however require special tooling for each fibre bundle diameter and are not ideally suited for the manufacture of terminations such as fused ends especially for fibre optic lighting harnesses. Fibre optic lighting harnesses are generally custom designed products adapted for delivery of light from a central light source to a number of spaced locations. The harness will include a number of fibre bundles with one set of ends collected in the proximity of the light source. The diameter of each of the fibre bundles will be dependent on the amount of light to be delivered by it and the distance over which that amount of light is required to travel before delivery.

Another prior method which involves the production of fibre optic terminations is disclosed in French Patent document Nos. A-2409802. This method is not a fused end method and involves pressing three rollers onto the outside of a ferrule holding the ends of fibres of a fibre optic bundle. As the rollers are so pressed they are turned so that they roll on the ferrule and deform same by a crimping action which brings the fibres held thereby into a hezagonal configuration. The device which is used for this method includes the use of wedge components which provide the radial pressure on the ferrule, but the wedge parts are required to rotate relative to each other, which can give rise to large friction forces.

The prior art in all embodiments does not provide a method and apparatus which can be used for making fused ends and which can be used for making fibre optic terminations of a relatively large size, in the order of 30 mm and greater, as well as being usable for the smaller sizes of fibre optic termiantions, in the order of 10 mm or less. Generally speaking, the prior art methods are suitable for producing only realtively small diameter fibre optic bundles in the order of up to 5 mm. The method and apparatus of the invention are also usable for producing fused ends. Also the ends and terminations of the present invention do not use epoxy resin and are capable of use in environments where the temperature can be higher than those usable with the epoxy bound ends.

It is an object of the present invention in one aspect to provide a method and means of terminating fibre optic bundles by a hot fusion method which does not require special tooling for producing terminations on different sized fibre of the bundles and with a degree of flexibility in the dimensions of the fibre bundles terminated and the terminations produced.

According to the present invention in one aspect, there is provided a method of forming a termination for a fibre optic bundle, the method including inserting the fibre optic bundle into a deformable ferrule, heating the fibre optic bundle and rolling a compression surface of a compression means against the ferrule whilst generating a compressive force between the ferrule and the compression means, thereby to constrict the ferrule and deform the fibres of the fibre bundle to substantially eliminate the spaces between the fibres in the fibre optic bundle.

The compression surface is preferably held at an angle with respect to the axis of the fibre optic bundle during rolling. Preferably, the compression surface is held at an angle of between 4° and 12°. The compression surface is preferably held at an angle in the region of 6°.

The compression member may comprise a rod or bar and the bundle may move along the rod during rolling.

Preferably, the compression means comprises a first compression member and a second compression member and the fibre optic bundle is compressed between the said members during rolling.

Where the compression means includes a rod or bar or two rods or bars, the ferrule is preferably rotationally driven during rolling. The ferrule is preferably driven in a reciprocating rotational fashion, first in one sense and then in the opposite sense. The ferrule may be driven around its axis by an amount of at least 180°, and further preferably approximately 200° in each rotational sense.

Where the ferrule is rotationally driven, the compression means may be mounted so as to be freely movable in a direction tangential to the ferrule. The compression rods or bars are however driven in the radial compression direction in order to deliver the compressive force onto the ferrule.

The fibre bundle and deformable ferrule may be preheated in a furnace prior to compression, and this makes the process particularly suitable for relatively large fibre bundles of diameters in the region of 5 mm to 30 mm.

The bar or bars may also be heated, and in a thermostatically controlled manner, and for sufficient length thereof to ensure that no cold part of any bar contacts the ferrule during rolling, which may cause distortion of the finished end. The heating process causes the fibres to soften past their glass transition point, so that they become quite soft and fluent, which means that no great compression force is in fact needed to constrict the ferrule and to form a fused end. After the end has been constricted, in order to avoid cracking of the fibres as they cool down, the cooling process is carefully controlled to ensure that it does not take place too quickly.

Although the invention has particular application to the formation of fused ends, it can also be used when only compression is used, i.e., without heat, or without the heat needed to form fused ends, and in such case another aspect of the invention results in which the compression means is said bar or bars.

An apparatus of a unique type has been developed for carrying out the method of the invention, and in accordance with another aspect of the invention there is provided an apparatus for forming termination on fibre optic bundles, comprising heating means for receiving and heating the fibre optic bundle end with a ferrule thereon, support means for supporting the bundle end for rotation of same about the axis of the bundle, and compression means for applying a compression force to the ferrule to constrict same whilst the bundle is supported by said support means, and drive means for causing relative movement between the ferrule and the compression means whereby the ferrule rotates and the compression means rolls on the ferrule.

The said drive means preferably is arranged to drive in a back and forth manner, so that the ferrule rotates back and forth and the compression means rolls back and forth on the ferrule.

The drive means is preferably arranged to drive the ferrule, and the compression means rolls as a result of the driving of the ferrule.

As with the method indicated above, the apparatus may in some cases be provided without the heating means, in which case the fibre optic bundle may be constricted by force alone. When no heat is used, the forces required to constrict the bundle will be greater than when heat is used.

An embodiment of the invention will now be described, by way of example, with reference to the accompanying diagrams, wherein:

FIG. 3 shows in plan view the fibre bundle shown in FIG. 1 before hot fusion;

FIG. 4 shows in plan view the fibre bundle of FIG. 3 after hot fusion;

FIG. 5 shows the fibre bundle of FIG. 4 after cutting and polishing of the fibre bundle end.

Figure 1:
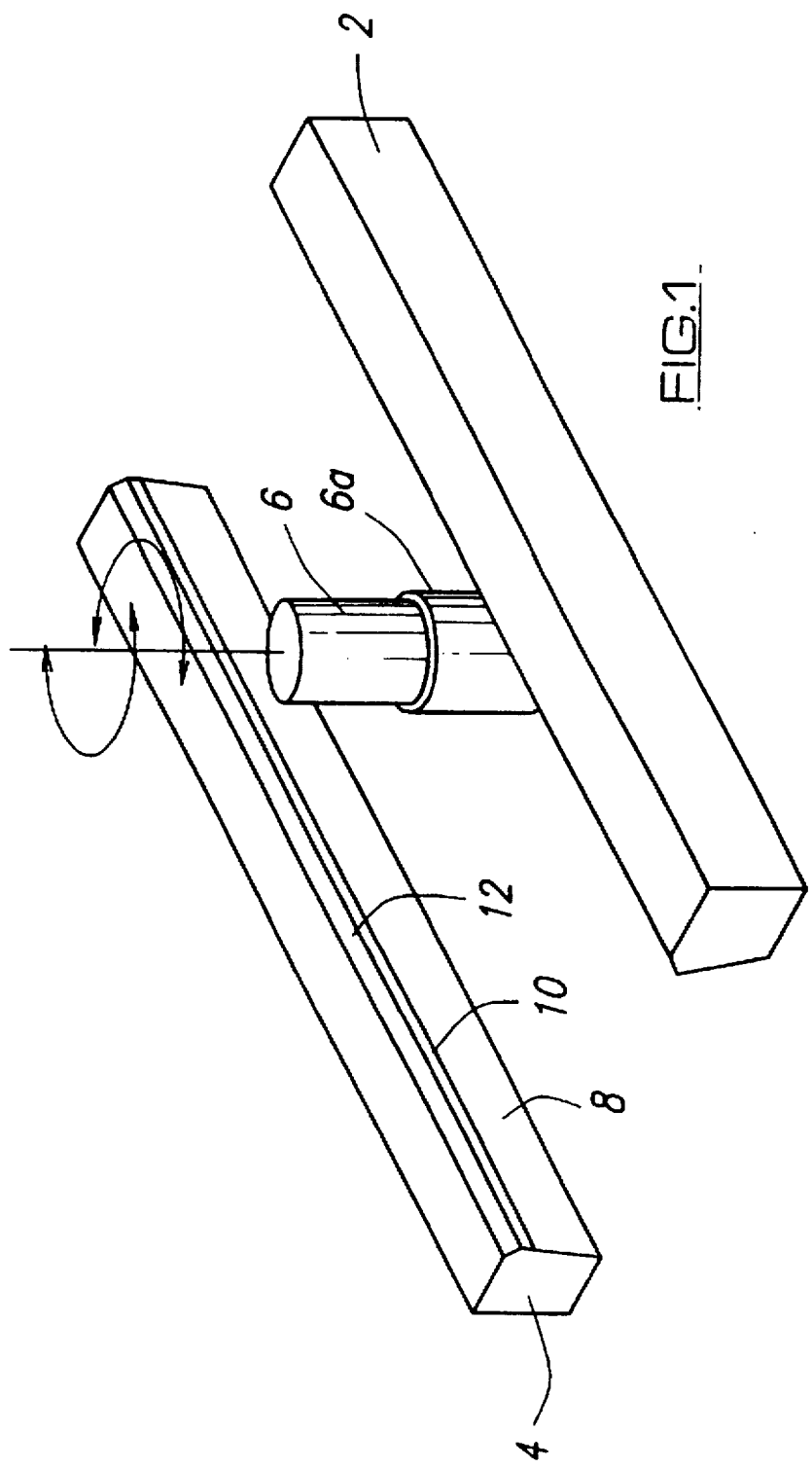
FIG. 1 illustrates a means according to and for performing the method of the present invention.

Referring now to FIG. 1, a means according to and for performing the method of the present invention includes parallel elongate and generally linear roll bars 2 and 4 which are mounted on frictionless bearings not shown so as each to be freely movable in their axial direction. The roll bars 2 and 4 are furthermore supported to be movable by motor driven gears in a lateral direction such that the spacing between the rollers can be readily altered by driving the gears.

The roll bars 2 and 4 are designed to act by rolling on a ferrule 6 which may be formed from stainless steel or brass or other strong malleable materials. The ferrule 6 encases a bundle of optical fibres 14 which, although not shown in FIG. 1, project from the upper extremity of ferrule 6 as shown in FIG. 3. As will be appreciated from FIG. 1, the ferrule 6 is stepped as at 6A for reasons which will be explained below. The ferrule is held in place centrally of the roll bars 2 and 4 during the process to be described, and is rotationally driven in an oscillating fashion alternately in opposing senses by amounts of 200°.

Before the roll bars 2, 4 are moved so as to act upon the ferrule 6 in the arrangement in FIG. 1, the ferrule and the glass fibre bundle therein are heated in a furnace so as to render the glass fibres malleable. The furnace may be set at a temperature so as to heat the glass to a temperature of perhaps 650° C. which is greater than the glass transition temperature of the fibres, although any temperature in this range of temperatures may be suitable.

Figure 2:
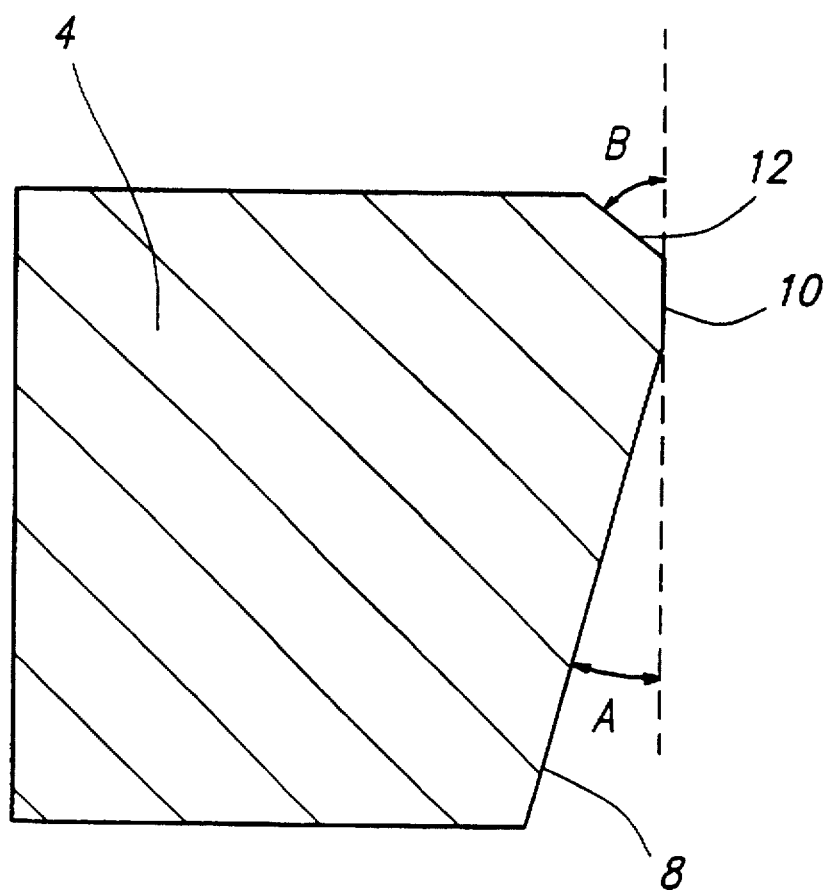
FIG. 2 shows a cross sectional view of one of the compression roll bars shown in FIG. 1.

With reference to FIG. 2, a cross section of roll bar 4 shows that the roll bar in this embodiment has three compression surfaces 8–12 which act upon the ferrule 6. The main compression surface 8 is sloped in use at an angle A, which in this embodiment is 6°, to the axis of the fibre bundle which is vertical. A second compression surface 10 is disposed parallel to the vertical axis of the fibre bundle, and a third compression surface 12 slopes at an angle B to the axis of the fibre bundle. Angle B is in this embodiment 45° C.

The relatively narrow vertical compression surface 10 forms the original point of contact between the roll bar 4 and the ferrule 6 and also produces the region of greatest constricting pressure during rolling. The slopes of compression surfaces 8 and 12 are chosen to form a neck shape on the ferrule 6 as shown in FIG. 4, as a result of rolling and compressing.

The roll bars 2 and 4 compress and roll the ferrule and during compression the ferrule is driven in an oscillating rotational fashion whilst the roll bars are driven inwards to crush the ferrule which along with its contents has been pre-heated. When the roll bars 2 and 4 first contact the ferrule 6, the rotation of the ferrule and frictional resistance between the ferrule 6 and roll bars 2 and 4 cause the roll bars to responsively reciprocate in their axial directions. It will be appreciated, on the other hand, that the roll bars 2 and 4 may be driven anti-phase in an axial reciprocating motion whilst the ferrule is freely rotationally mounted so as to react to the motion of the roll bars 2, 4 when abutting same.

The progress of the roll bars inwards, which is progressive is halted at a predetermined point. At this point, constriction of the ferrule has been sufficient to achieve effective fusing of the glass fibres therein at least in the area of greatest constriction.

It is to be mentioned that the extent to which the roll bars 2 and 4 move together is quite small, because as the fibres are heated to a high temperature beyond the glass transition temperature of the fibres, the fibres become quite soft and fluent and no great force is needed to provide the desired effect. In fact, the inward movement of the bars 2, 4 may be as small as 1 or 2 mm for a 15 mm ferrule and the force to effect such movement may be as little as 10 gms.

As described above in relation to FIG. 1, the metal ferrule 6 is stepped as at 6A so that it has an increased thickness away from the fibre bundle end. The decrease in thickness towards the bundle end, which could also, for example, be achieved by tapering of the ferrule away from the fibre bundle end, is desirable in order to achieve a sufficiently elevated temperature at the end to be fused during heating. A ferrule of constant thickness might tend to conduct an excessive amount of heat away from the fibre bundle end and cause difficulties in achieving homogenous heating at the fibre bundle end.

As a final step, after the fibre bundle end has cooled, the termination is cut (which may be through the ferrule or not) in the region of greatest constriction as shown in FIG. 5, and the end face 16 is polished so as to form a highly transparent optical coupling surface. Before finishing, the glass of the fused optical fibres in the condition shown in FIG. 4 may be annealed so as to strengthen the final termination.

FIG. 3 illustrates the encased fibre bundle before hot fusion, and FIG. 4 illustrates the same fibre bundle after hot fusion. It can be seen that the outer ferrule and protruding fibres 14 have adopted the impression of the profile of the compression surfaces 8, 10 and 12 and the rolling effect of the roll bars has ensured that the fused fibre bundle remains rotationally symmetrical.

Although the bar profile indicated in FIG. 2 is preferred, it is not essential, and other profiles, including a straight profile could be used. Equally, the ferrule need not be of the stepped configuration shown. It could, for example, be straight-sided.

Figure 6:
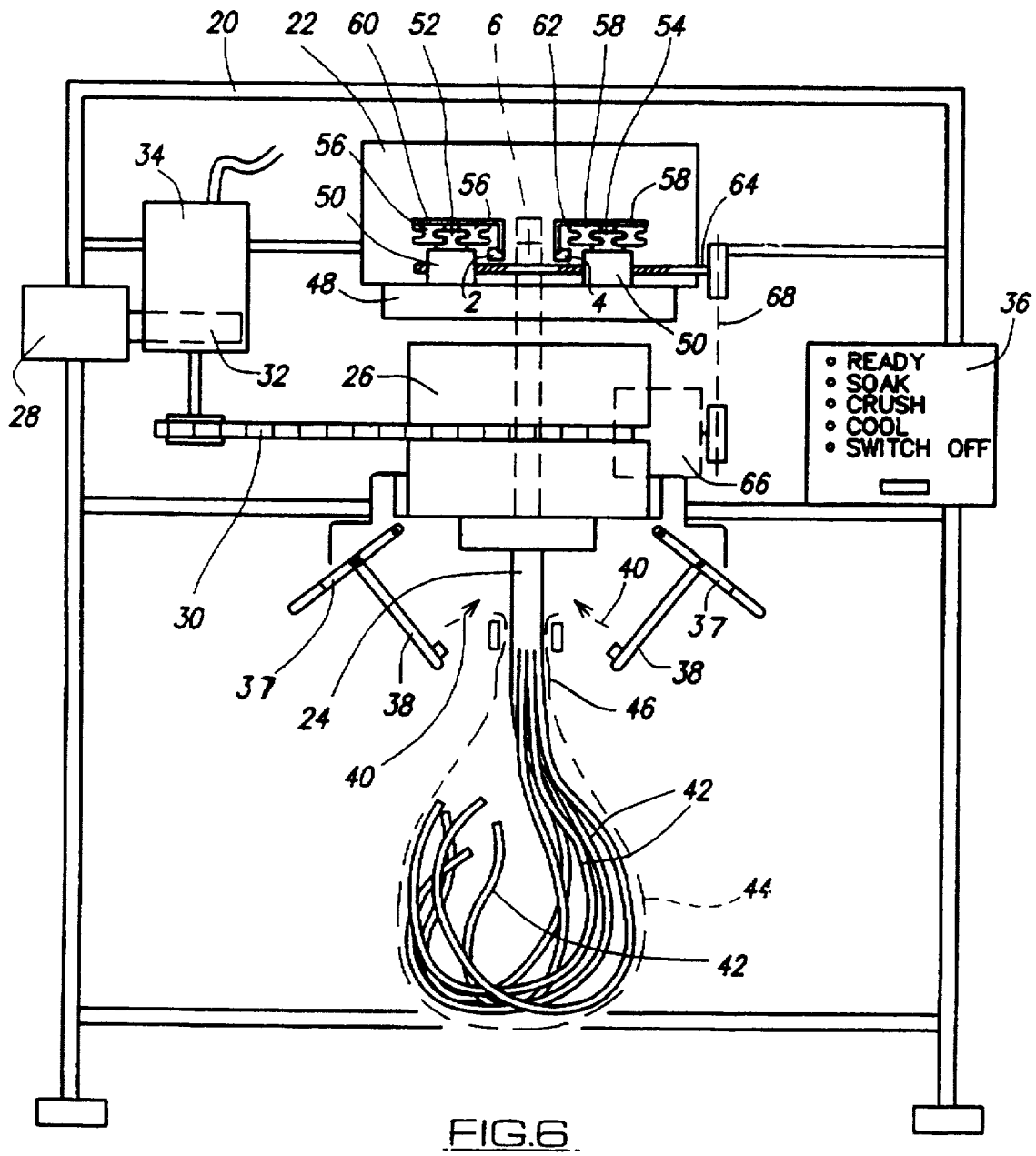
FIG. 6 shows in diagrammatic form and apparatus for performing the methods of and according to the present invention.

Reference is now made to FIG. 6 which shows one form of machine which is according to the invention and can be used for the methods of the present invention. The machine shown in FIG. 6 comprises an ioenwork frame 20 having upright legs and cross members. The cross members support a furnace 22 into which the end 6 of the fibre optic bundle projects upwardly. The fibre bundle, referenced 24 is carried by a rotatable chuck 26, which is drivingly connected to a drive motor 28 through a chain drive 30, and a worm gearbox 32. The gearbox is associated with an encoder 34, coupled conventionally to a solid state control system 36, carried by the frame 20.

The chuck is provided with a pair of clamps 37 having clamping arms 38 which in use are manually swung, as indicated by the arrows 40 to a position inwardly of the chuck 26 to clamp and hold the harness 24 at its common end inside the furnace 22 in the correct attitude to be presented to the bars 2 and 4, as will be described. The tail ends 42 of the harness 24 are collected in a bag 44 which has its open end tied as at 46 around the harness 24 as shown. It will be understood that with the harness 24 positioned, when the motor 28 is driven, so the harness will be rotated about its axis passing through the ferrule 6. The driving of the motor 28 is under the control of the circuit 36.

Above the chuck 26 is a platform 48 which carries four blocks 50, two being shown and the other two being at the other side of the furnace 22. These blocks carry in turn two guide rails 52, 54 of the waisted profile shown, and these rails support rollers 56, 58 which run freely on the rails 52, 54. The rollers 56, 58 (similar arrangement provided at each side of the furnace 22), carry brackets 60, 62 and these brackets 60, 62 in turn are attached to the bars 2 and 4, which extend through the furnace 22. The blocks 50 at each side of the furnace 22 are adapted to be moved closer together and further apart by means of a two handed feed screw 64 which is threaded into the blocks 50 and is adapted to be rotated by means of a further motor 66 and a further chain drive 68. The operation of the apparatus is automatically controlled by the circuit 36, after the desired parameters have been fed into the circuit 36 by an operator. As can be seen from FIG. 6, the circuit 36 has a display panel which indicates the stage of the process as each fibre optic bundle is being processed according to the embodiment of the invention.

The operation of the machine is as follows:

When the fibre optic bundle to be provided with a fused end has been selected, the parameters of the bundle are inputted to the machine, and the bundle is fitted as shown in FIG. 6, except that additionally the clamps 37 are moved to the clamping position. The bars 2, 4 are spaced from the ferrule 6 as shown.

The electrical power is now switched on and the furnace starts to heat up the bars 2, 4 where they extend through the furnace 22. The fibre optic end and ferrule 6 are also heated. To assist in even heating, the motor starts to turn in one direction only and at a low speed—in the order of one revolution per second. This state continues until a "Ready" light is illuminated on the panel of 36 which indicates that the furnace 22 is at a pre-set temperature and that the bars 2, 4 are heated to the required degree throughout the required length. In this connection the bars 2, 4 are provided with thermostats to indicate the temperature of same, and a signal indicative of the bar temperature is supplied to the control circuit 36.

This is followed by a soak period during which the ferrule is brought up to a temperature of the order of that referred to herein.

After this period, the motor 34, which has been turning uni-directionally, now starts to turn in an oscillatory manner as described herein, and the motor 66 is driven to cause the blocks 50 to move together, which has the effect of moving the bars 2, 4 together and crushing the ferrule for the purposes set forth. This is the "Crushing" stage. At the end of this stage, the bars 2, 4 are retracted and the motor 66 is stopped. After the crushing, and the extent of the crushing is automatically detected by the circuit 36, the furnace is cooled down in a controlled manner to "Anneal" the fibres so that they do not crack and the motor 34 is returned to uni-directional driving. After the annealing stage, the fibres are then cooled down to a handlable temperature, when the machine can be switched off and the harness removed for the usual finishing operation of grinding and polishing.

By way of example, in a typical operation, the end may be of a diameter in the region of 15 mm with 12 "ends" which means twelve small bundles making up the cable; each end may typically have 5000 fibres, and the temperature to which the ferrule and the fibres are heated will be in the region of 700/800 degrees C. The oscillation speed of the chuck 26 would be in the order of 1 second per cycle, and the force needed to compress the ferrule may be of the order of 10 gms.

It may be desirable to ensure that the bars 2, 4 can "float" horizontally to enable the bars to take account of any irregularities of the ferrule 6 and to this end the platform 48 may be mounted for floating movement, with one of the blocks 50 at each end fixed and only the other at each end movable by means of the feed screw 64.

The present invention provides for a method of forming a fused fibre optic termination which allows a variety of diameters of fibre optic bundle to be terminated using only one set of compression roll bars. The wedge shape formed by the compression surfaces of the rollers allows various degrees of compression to be attained using same. Other arrangements could be envisaged for symmetrically compressing the hot glass in the terminations with a similar effect. For example, the fibre bundle end could be impinged upon by a set of roller wheels rotating with axes of rotation parallel to the axis of the fibre bundle at its end. Each such rotating roller wheel would have an outer profile identical or similar to that of the linear rollers 2 and 4 as shown in FIG. 2.

Although it is highly likely that heat will be required to soften the fibres for compression, for some fibres, heat may not be required.

It will be understood that the compression means, e.g., the roll bars 2 and 4 perform a compressing effect as they are moved together to constrict the ferrule and the fibre optic bundle to provide the effect shown in FIG. 4. The movement together of the compression surfaces may be sequenced with the driving of the ferrule in an oscillatory manner. For example the oscillation motion may be commenced before contact with the compression surfaces takes place. As the ferrule is oscillated the compression surfaces are progressively moved together in order to clench the ferrule and constrict same and to compress the fibres to exclude air. The heat will normally have been applied to the fibre bundle end before this constriction takes place, but in some cases as indicated heat may not be necessary or heat may be applied whilst the constriction is taking place. Again, when the compression surface members are the driven members they may be set in drive motion before they are actually moved together to constrict the ferrule. Any suitable sequence of steps may be adopted in order the achieve the desired effect.

A person skilled in the art will appreciate that various modifications and additions might be made to the above described embodiment without departing from the scope or exceeding the spirit of the present invention.

What is claimed is:

1. Apparatus for producing a termination on a fibre optic bundle held in a deformable ferrule, the apparatus comprising:

compression means for constricting the bundle and deformable ferrule, said compression means being provided with:

first and second compression surfaces for communicating compressively with the deformable ferrule; and drive means for moving said first and second compression surfaces radially with respect to the deformable ferrule; and support means for supporting the deformable ferrule rotatably as it is compressed.

2. Apparatus according to claim 1 wherein said drive means is further arranged to drive the deformable ferrule rotatively.

3. Apparatus according to claim 2, wherein said drive means is further arranged to oscillate the deformable ferrule rotatively.

4. Apparatus according to claim 3, wherein said drive means is arranged to oscillate the deformable ferrule rotatively over an angle of rotation of approximately 200°.

5. Apparatus according to claim 1 wherein said first and second compression surfaces each comprise a respectively associated one of first and second straight compression bars arranged parallel to one another an diametrically opposite in relation to the deformable ferrule, said first and second compression bars being movable together to effect compression and constriction of the deformable ferrule and the fiber optic bundle.

6. Apparatus according to claim 5, wherein said compression surfaces are profiled so as to compress the deformable ferrule and fiber optic bundle into a necked configuration.

7. Apparatus according to claim 6, wherein the profiling is configured as a narrow face arranged parallel to a central axis of the fiber optic bundle, there being further provided first and second angled faces which angle back from said narrow face in opposite directions.

8. Apparatus according to claim 7, wherein said compression bars are identical to one another and are arranged symmetrically about the central axis of the fiber optic bundle.

9. Apparatus according to claim 1, wherein there is further provided a chuck for holding the fiber optic bundle and the deformable ferrule rotatably about a central axis of the deformable ferrule.

10. Apparatus according to claim 1, wherein there is further provided a furnace for heating the fiber optic bundle and the deformable ferrule to facilitate constricting to effect a fused end on the bundle, said first and second compression surfaces being disposed in said furnace.

11. Apparatus according to claim 10, wherein said first and second compression surfaces are supported by support means arranged outside of the furnace for supporting said first and second compression surfaces for reciprocal movement.

* * * * *